Nov. 9, 1948.  E. F. McDONALD, JR  2,453,245
DEVICE FOR RELEASING SNAGGED FISHING LURES OR BAITS
Filed March 4, 1946
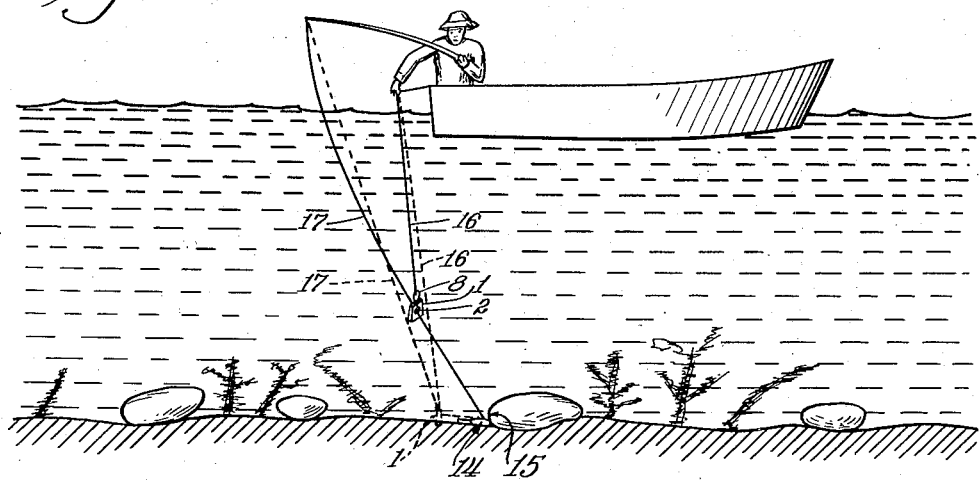
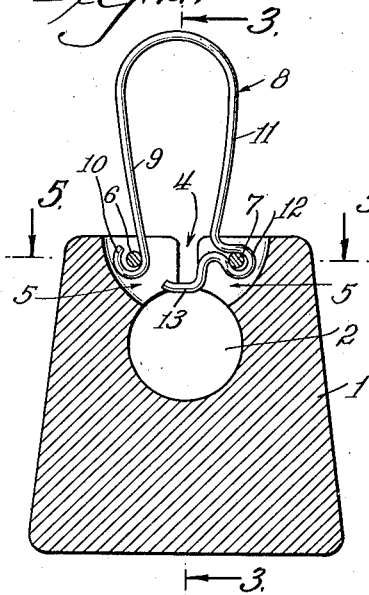
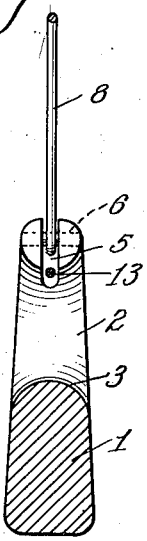
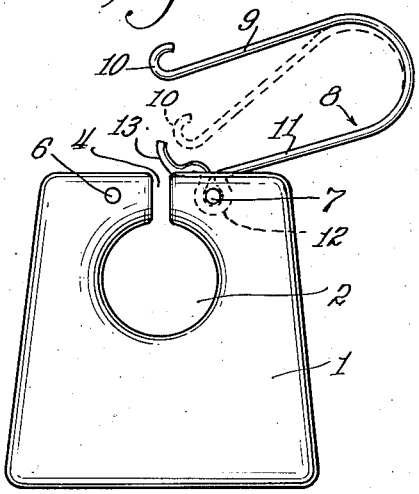
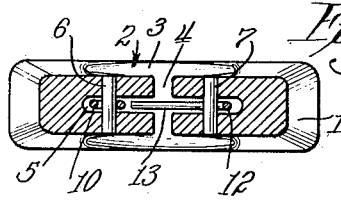
INVENTOR.
Eugene F. McDonald Jr.
BY
J. Clarke Hagey
Atty.

Patented Nov. 9, 1948

2,453,245

UNITED STATES PATENT OFFICE 2,453,245

DEVICE FOR RELEASING SNAGGED FISHING LURES OR BAITS

Eugene F. McDonald, Jr., Chicago, Ill.

Application March 4, 1946, Serial No. 651,674

3 Claims. (Cl. 43—30)

This invention relates to a device for releasing snagged fishing lures or baits, and is more particularly concerned with the provision of a novel device for this purpose which may be easily and quickly applied to the fishing line and effectively employed to free the snagged lure or bait attached thereto without becoming itself fouled with the line or entangled with the obstruction.

While the device is useful for freeing snagged fishing tackle of various descriptions, I shall describe its use for the purpose for which it is more especially designed and in which it differs from any other device known to me.

When trolling along or near the bottom in comparatively deep water, it is customary to use a lure or artificial bait which, when drawn through the water, simulates the swimming of a live bait, some forms of lures and baits weaving from side to side and others rising and diving, and this erratic action of the bait is sometimes the cause of its swinging into or diving beneath some obstruction, the nature of which cannot be determined by the fisherman. In order to avoid breaking of the fishing line and losing a favorite or valued lure or bait, the obvious action of the fisherman is to attempt to dislodge the bait from the obstruction by backing it out therefrom. In shallow water, this may be accomplished by maneuvering the fisherman's boat to a position in which the bait may be pulled back from the obstruction, but in comparatively deep water, it is more difficult, because the nature of the obstruction cannot be determined and the proper backing out angle of the fishing line cannot be so easily effected, and the line or bait may become further and perhaps hopelessly snagged. The device I shall describe has proven satisfactorily effective in such instances and, so far as I am aware, differs in construction and action from other de-snagging devices, principally in that it may be lowered along the fishing line and be guided thereby to a position near the snagged bait without the lowering line of the device becoming twisted about the fishing line, and without the device itself becoming fouled with the line or entangled with obstacles. With any appreciable degree of backward slant to the fishing line, the lowering of the device therealong will deflect the backing out angle of the line with respect to the attached and snagged lure or bait, this deflection increasing as the device approaches the bait.

In the drawings—

Figure 1 illustrates one use of my device for releasing snagged fishing lures or baits, showing in full lines the partial lowering of the device in engagement with and guided by the fishing line toward the snagged bait, and in dotted lines the fully lowered position of the device and its deflecting action upon the fishing line to assist in backing out the bait from the obstruction;

Fig. 2 is a front vertical sectional view of the view of the device, showing the supporting loop or bail thereof in closed position;

Fig. 3 is a transverse sectional view, taken upon the line 3—3 of Figure 2;

Fig. 4 is a front elevational view of the device, showing the supporting loop or bail thereof in open position; and Fig. 5 is a horizontal sectional view, taken upon the line 5—5 of Figure 2.

While the device may, of course, be made in different sizes, I have found the size shown in full scale in Figures 2 to 5 to be preferable for general use in comparatively deep water fishing The body 1 consists of a slab-like block or plate of zinc, lead, or other weighty solid, the four side faces of which are upwardly tapered as shown. As viewed in Figure 2, a circular opening 2 extends through body 1 from front to back and above the central portion thereof. All edges are rounded and smooth, particularly so around the circular opening 2, as shown at 3 in Figure 3. A line entrance slot or passage 4 extends downwardly from the top face of body 1 into opening 2, and a similarly extending transverse slot 5 crosses passage 4. Pins 6 and 7 are riveted or otherwise secured in body 1, crossing slot 5 upon opposite sides of passage 4, to serve as anchorages for the supporting loop or bail 8. Bail 8 is formed, preferably of spring wire, to serve both as a supporting loop and as a gate for the passage 4, one arm 9 thereof terminating in a hook 10 releasably engaging pin 6 and the other arm 11 being hingedly attached to body 1 by an eye or bight 12 bent therein about pin 7, and terminating in an arm 13 which, when the loop or bail 8 is in the closed position shown in Figure 2, bridges across the line entrance slot or passage 4.

Referring, now, to Figure 1, it will be assumed that the fisherman has backed up his boat and fruitlessly attempted to back out the snagged bait 14 from the obstruction 15. It will be assumed, also, that he is prepared for the occasion by having one of the present devices ready for use, with a lowering line 16 attached to the bail 8. He grasps bail 8, presses arm 9 inwardly and downwardly to disengage hook 10 from pin 6, and turns bail 8 to the open position shown in Figure 4, where it will be observed that arm 13 has been swung upwardly to open the line entrance passage 4. Still retaining his grasp of bail 8, he then hooks body 1 of the device around the fishing line 17, the fishing line passing through slot or passage 4 into opening 2, and closes the bail into the position shown in Figure 2, in which the hook 10 engages with pin 6 and arm 13 closes the entrance of slot 4 into opening 2, thereby securely locking the device around the fishing line. It will be noted that, when the device is thus ready for use, all of the lower parts of bail 8 are housed within transverse slot 5, and that no parts of the device are exposed which might become snarled with the fishing line or snagged with obstructions.

The fisherman then lowers the device along the fishing line 17, which he holds fairly taut, the weight of the device acting to deflect the line more and more as it approaches the snagged bait. Whether the fisherman is directly over, to either side, or back of the bait, this deflecting action of the device upon the fishing line will have a dislodging effect upon the snagged bait. The use of the device shown in Figure 1 is, of course, but one of many ways of employing it, depending to a large extent upon the nature of the obstruction. The shape, size, weight, and construction of the device have all been considered in fitting it for general use for the purposes mentioned.

I claim:

1. A device for releasing snagged fishing lures or baits comprising a weighted body having a transverse opening therethrough and a passage extending from an outer surface of said body to said opening, a supporting member attached to said body upon opposite sides of said passage, and gate means operable by the movement of said supporting member with respect to said body to bar and unbar said passage.

2. A device for releasing snagged fishing lures or baits comprising a weighted body having a transverse opening therethrough and a passage extending from an outer surface of said body to said opening, a supporting member pivotally attached to said body at one side of said passage and releasably attached to said body at the opposite side of said passage, and gate means forming a part of said supporting member and operable by the movement thereof about its pivotal attachment to said body to bar and unbar said passage.

3. A device for releasing snagged fishing lures or baits comprising a slab-like weighted body having a transverse opening therethrough above the central portion thereof, an entrance passage extending from the upper edge surface of said body to said opening, and a slot crossing said passage, pins secured in said body across said slot upon opposite sides of said passage, a supporting member releasably engaged with one of said pins and pivotally engaged with the other of said pins, and an arm formed as an extension of said member beyond its pivotal engagement and extending across said entrance passage.

EUGENE F. McDONALD, Jr.

REFERENCES CITED

The following references are of record in the file of this patent:

UNITED STATES PATENTS

| Number | Name | Date |
| --- | --- | --- |
| 1,371,188 | Wells | Mar. 8, 1921 |
| 2,385,415 | Jackson | Sept. 25, 1945 |
| 2,395,892 | Lontz | Mar. 5, 1946 |